United States Patent
Mizuno et al.

[11] Patent Number: 5,833,070
[45] Date of Patent: Nov. 10, 1998

[54] STRETCHED POLYCHLOROTRIFLUOROETHYLENE FILM, PROCESS FOR THE PRODUCTION THEREOF AND PACKAGED PRODUCT USING THE FILM

[75] Inventors: Toshiya Mizuno, Tsuchiura; Yoshikichi Teramoto, Inashiki-gun; Yasuhiro Tada, Niihari-gun, all of Japan

[73] Assignee: Kureha Kagaku Kogyo Kabushiki Kaisha, Japan

[21] Appl. No.: 867,459

[22] Filed: Jun. 2, 1997

Related U.S. Application Data

[63] Continuation of Ser. No. 447,025, May 22, 1995, abandoned.

[30] Foreign Application Priority Data

May 25, 1994 [JP] Japan .................................. 6-133902
Apr. 28, 1995 [JP] Japan .................................. 7-127535

[51] Int. Cl.⁶ .............................. B65B 85/42; A61J 1/00; C08F 14/00
[52] U.S. Cl. ..................... 206/524.4; 206/418; 206/528; 206/524.1; 206/524.6; 428/35.2; 428/35.4; 428/35.5; 428/36.6; 428/910; 428/917; 526/242; 526/249; 264/290.2; 264/345
[58] Field of Search ................... 428/421, 35.2, 428/35.4, 35.5, 917, 910, 36.6; 526/242, 249; 206/524.1, 524.4, 524.6, 528, 418; 264/290.2, 345

[56] References Cited

FOREIGN PATENT DOCUMENTS

| | | |
|---|---|---|
| 1-158047 | 6/1989 | Japan . |
| 2-141224 | 5/1990 | Japan . |
| 4-182115 | 6/1992 | Japan . |
| 93-06159 | 4/1993 | WIPO . |
| 93/06158 | 4/1993 | WIPO . |

OTHER PUBLICATIONS

Database WPI, Section Ch, Week 9334, Derwent Publications LTd., London, GB; Class A14, AN 93–269495, 1993.

Database WPI, Section Ch, Week 9328, Derwent Publications Ltd., London, GB; Clas A14, AN 93–223875, 1993.

Database WPI, Section Ch, Week 9243, Derwent Publications Ltd., London, GB; Class A14, AN 92–353378, 1992.

"Nitto Giho", vol. 25, No. 1 (1987).

Primary Examiner—Paul J. Thibodeau
Assistant Examiner—D. Lawrence Tarazano
Attorney, Agent, or Firm—Wenderoth, Lind & Ponack, L.L.P.

[57] ABSTRACT

A stretched PCTFE (polychlorotrifluoroethylene) film is provided with a good moisture-proofness (low moisture permeability) even at a relatively small thickness and at a small crystallinity The film is characterized by a crystallinity A (%) of 15–75% and a moisture permeability B (mg/m².day) at a film thickness of 20 μm, satisfying a relationship of $B/(100-A) \leq 3.0$. The film may suitably be produced through a process characterized by a sequence of a relatively low-temperature melt-extrusion and a low temperature stretching. The film is suitably used for constituting moisture-proof packaged products, such as an EL device or a packaged drug product.

14 Claims, 1 Drawing Sheet

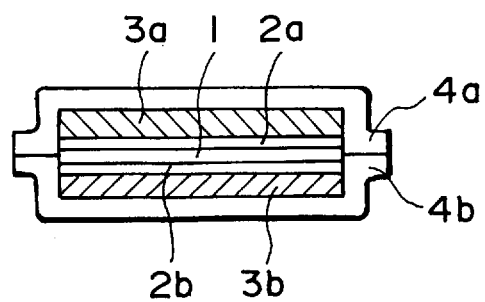
F I G. 1
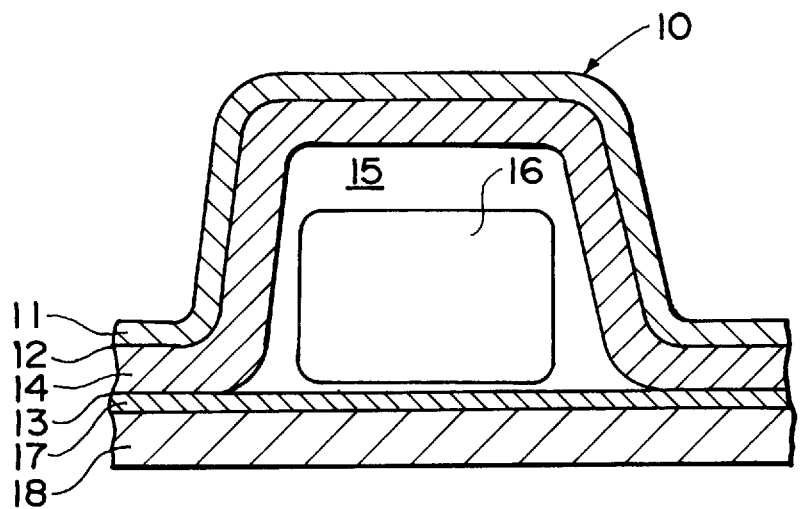
F I G. 2

STRETCHED POLYCHLOROTRIFLUOROETHYLENE FILM, PROCESS FOR THE PRODUCTION THEREOF AND PACKAGED PRODUCT USING THE FILM

This application is a continuation application of Ser. No. 08/447,025, filed May 22, 1995, now abandoned.

FIELD OF THE INVENTION AND RELATED ART

The present invention relates to a stretched film of polychlorotrifluoroethylene (hereinafter sometimes abbreviated as "PCTFE"), a process for production thereof and a packaged product using the film. More particularly, the present invention relates to a stretched PCTFE film having a relatively low moisture permeability even at a low crystallinity, a process for producing such a stretched PCTFE film under specific melt film-forming and stretching conditions, and a packaged product, such as an electroluminescence device or a medical drug, using the film.

Hitherto, a PCTFE film has been known to have a low moisture permeability and has therefore been used for protecting a product with which moisture contact is undesirable, e.g., as a material for coating and sealing an electroluminescence (hereinafter abbreviated as "EL") device. In recent years, thinning or production in a smaller thickness of an EL device has been desired so as to remarkably enlarge the field of application thereof. For example, by the thinning, the EL device can be reduced in size and weight and can be provided with a flexibility, so that it can be loaded on small-sized portable machines and can have a larger latitude in shape designing so as to allow light-emission devices having a curve luminescent surface or profiled luminescent surface. As a result, EL devices can be used, e.g., as a light-weight backlight for liquid crystal displays, supplementary illumination for interior use, decoration light sources for sign displays and illumination means for illuminating characters on watches or portable telephones.

In addition, because of a low moisture permeability characteristic, a PCTFE film has been used or expected to be used as a moisture-proof coating material or packaging material for a product or material with which moisture contact is not desirable, such as electrical components, electronic components, medical materials and drugs.

In order to comply with the above-mentioned desire of providing a thinner EL device or economization of material in general, it has been expected to provide a PCTFE film having a low moisture permeability or high moisture-proofness even at a low thickness. However, a plastic film has a moisture permeability which is inversely proportional to its thickness, i.e., increases at a smaller thickness, and this tendency has been known to hold true also with a PCTFE film (e.g., as disclosed in "Nitto Giho", Vol. 25, No. 1 (1987)). Further, it is also well known that the thinning of a film will generally provide lower film strengths, such as toughness and tear strength. Accordingly, it is desired to provide a PCTFE film having a low moisture permeability and also good mechanical strengths even at a small thickness.

As a representative method of improving the moisture-proofness of a PCTFE film, it has been known to increase the crystallinity of the film. However, the increase in crystallinity of a film is generally liable to provide inferior mechanical properties, such as embrittlement of the film resulting in a lower rupture stress, and also cause opacification of the film leading to inferior appearance, optical properties and capability of seeing-through of the insert to be packaged by the film, thus being liable to restrict the applicability of the PCTFE film. Accordingly, there is a certain limit in improving the moisture-proofness only by the increase in crystallinity thereof.

As another method of improving the moisture-proofness of a PCTFE film, it has been also known to stretch the PCTFE film. However, the stretching of a PCTFE film is accompanied with serious difficulties arising from a high melt-viscosity of a PCTFE resin.

More specifically, because of a high melt viscosity, a PCTFE resin has been generally extruded at a high temperature which is higher by about 100° C. than its melting point (ca. 210°–230° C.) to form a extruded film or sheet, which is then quenched to provide a feedstock film or sheet for stretching. Such a combination of high temperature extrusion-quenching has been conventionally adopted in order to prevent the surface roughening and/or thickness fluctuation of a resultant film or sheet formed by extrusion at a lower extrusion temperature and also to prevent the opacification and decrease in strength caused by a sudden increase in crystallinity in this stage (Japanese Laid-Open Patent Appln. (JP-A) 1-158047, JP-A 4-182115 and JP-A 2-141224). Further, it is also known that the high temperature extrusion necessarily adopted conventionally inevitably causes a partial decomposition and a lowering in molecular weight of the PCTFE resin during the extrusion (see the above JP publications, for example).

In order to obviate such difficulties of the melt-extrusion, the above-mentioned JP-A 1-58047 has proposed a process for producing a rolled PCTFE film wherein a PCTFE resin is compression-molded into a block, which is then gradually cooled so as to provide a crystallinity of at least 50%, sliced and then rolled.

Further, JP-A 4-182115 has disclosed a process producing a rolled PCTFE film, wherein a PCTFE resin is extruded at a temperature of 300° C. or below which is lower than the conventionally adopted extrusion temperature, and the thickness fluctuation or irregularity of the resultant film is reduced by rolling, followed further by heat-treating, to provide a film having an increased crystallinity.

Further, JP-A 2-14122 has disclosed a process for producing a stretched PCTFE film wherein a PCTFE resin is melt-extruded under the conventional conditions into a film, which is then stretched at a temperature of at least 100° C. and heat-set at a temperature higher than the stretching temperature to increase the crystallinity.

However, the rolled or stretched PCTFE films obtained through the above-mentioned processes have thicknesses of 100–200 μm or even larger and thus are not sufficiently thin. Further, according to our study, these films have not sufficiently utilized the effect of enhancing the moisture-proofness according to stretching.

Further, from the viewpoint of productivity, the production by rolling of a PCTFE film involves a batch process and the productivity thereof is not good enough. Further, the conventional production of a PCTFE film through melt-extrusion-stretching is accompanied with a problem that melt-fracture is liable to occur during the melt-extrusion.

SUMMARY OF THE INVENTION

In view of the above-mentioned circumstances, a principal object of the present invention is to provide a stretched PCTFE film having a relatively low moisture permeability even at a low crystallinity and a small thickness.

Another object of the present invention is to provide a stretched PCTFE film having an excellent moisture-proofness and also excellent mechanical properties as represented by a high rupture stress.

Another object of the present invention is to provide a process for producing such a stretched PCTFE film.

A further object of the present invention is to provide a packaged product, such as an EL device or a medical drug, using such a stretched PCTFE film.

According to a first aspect of the present invention, there is provided a stretched polychlorotrifluoroethylene film, comprising a stretched film of a polychlorotrifluoroethylene resin, and having a crystallinity A (%) of 15–75% and a moisture permeability B (mg/m² day) at a film thickness of 20 μm, satisfying a relationship of formula (1) below:

$$B/(100-A) \leq 3.0 \tag{1}$$

According to a second aspect of the present invention, there is provided a process for producing a stretched polychlorotrifluoroethylene film, comprising: melt-extruding a polychlorotrifluoroethylene resin at a temperature of 250°–320° C. to form a sheet, and stretching the sheet at an areal stretch ratio of at least 3.0 at a temperature of 50°–85° C. to form a film.

According to the present invention, there is further provided a packaged product, comprising an insert, and a stretched polychlorotrifluoroethylene film as described above covering the insert so as to suppress moisture permeation to the insert from an environment.

A small value of the term $B/(100-A)$ in the formula (1) characterizing the stretched PCTFE film according to the present invention means that an amorphous portion $(100-A)$ % of the film effectively contributes to an increase in moisture-proofness (i.e., prevention of an increase in moisture permeability), and the effect is attained by the amorphous portion comprising molecular chains formed by effective stretching. The values of the term $B/(100-A)$ given by conventional stretched PCTFE films have exceeded 3.

On the other hand, the process for producing a stretched PCTFE film according to the present invention is, in short, characterized by a combination of melt-extruding a PCTFE resin at a relative low temperature compared with conventional temperatures to form a stock sheet and stretching the stock sheet at a temperature lower than those conventionally adopted.

According to our study, it has been determined that a principal cause of difficulty in stretching of a PCTFE film resides in decomposition of the resin or formation of a lower molecular weight product, which per se has been known, during the high temperature melt-extrusion for providing a stock sheet for the stretching, and the thus-formed low-molecular weight PCTFE is dispersed ununiformly in the stock sheet to cause a local over-stretching during the stretching especially at a conventional high temperature exceeding 100° C., thus leading to breakage of the stretched film or, if not such breakage does not actually occur, obstruction to formation of a uniformly stretched film. In contrast thereto, in the process of the invention, the formation of such low-molecular weight PCTFE components is suppressed due to a relatively low melt-extrusion temperature (250°–320° C.). On the other hand, the low stretching temperature (50°–85° C.) of the present invention may be regarded as a temperature allowing a necking stretching (i.e., stretching accompanied with a stress yield in the neighborhood of a point providing a maximum stress on a stress-strain curve obtained through a tensile stress test, that is a temperature providing a maximum stress on a stress-strain curve of a PCTFE sheet. As a result, some difficulty in melt-extrusion at a low extrusion temperature can arise but may be solved by using a resin having a specific flow rate, as desired, whereby a PCTFE film having a sufficiently low moisture permeability is produced through the process of the present invention. Further, even if a stock sheet having a thickness fluctuation may be produced as a result of the low temperature melt extrusion, a relatively thick portion of the sheet is preferentially stretched during the necking stretching to provide a smoother PCTFE stretched film. Further, as the stretching is performed at a low temperature, a higher stretching effect (effect of imparting a tension to polymer chains) can be attained than a higher temperature stretching at the same stretch ratio, thereby providing the amorphous portion of the stretched PCTFE film with a higher moisture-proofness. This is believed to be a principal factor for providing the stretched PCTFE film of the present invention with a low $B/(100-A)$ ratio. Further, the high stretching effect also contributes to improvements in mechanical properties of the film, particularly a rupture stress. This effect has been confirmed also by comparison with a PCTFE film (unstretched) having a high crystallinity of 50% or higher.

These and other objects, features and advantages of the present invention will become more apparent upon a consideration of the following description of the preferred embodiments of the present invention taken in conjunction with the accompanying drawing.

BRIEF DESCRIPTION OF THE DRAWING

FIG. 1 is a schematic sectional view of an embodiment (EL device) of the packaged product according to the present invention.

FIG. 2 is a schematic sectional view of another embodiment (drug) of the packaged product according to the present invention.

DETAILED DESCRIPTION OF THE INVENTION (PCTFE resin)

The PCTFE resin used in the present invention may comprise chlorotrifluoroethylene homopolymer, a copolymer of chlorotrifluoroethylene with a monomer copolymerizable therewith, or a mixture of these. The monomer copolymerizable with chlorotrifluoroethylene may include one or more species of vinylidene fluoride, ethylene trifluoride, tetrafluoroethylene and hexafluoropropylene. The polymerized content of chlorotrifluoroethylene in the copolymer may preferably be at least 80 wt. %, more preferably at least 95 wt. % in view of moisture-proofness. In order to provide a good moisture-proofness, it is further preferred to use chlorotrifluoroethylene homopolymer.

(Crystallinity of film)

The stretched PCTFE film according to the present invention has a crystallinity in the range of 15–75%. Within this range, a relatively low crystallinity of 15–50% is preferred in view of the rupture stress and softness. If the moisture-proofness is thought more of, a relatively high crystallinity of 50–75% is preferred in the above range.

As mentioned above, the stretched PCTFE film of the present invention is most characterized by a large moisture-proofness of its amorphous portion due to the stretch effect, i.e., having a $B/(100-A)$ ratio of at most 3. The ratio is preferably at most 2.8, more preferably at most 2.7, most preferably at most 2.5. The lower limit of the ratio is about 2 as values obtained up to now but need not essentially be restricted as far as the stretched PCTFE film of the present invention retains a film form.

The stretched PCTFE film of the present invention may have a high rupture stress of at least 50 MPa at least in the machine direction (MD), preferably both in the machine direction (MD) and the transverse direction (TD).

The stretched PCTFE film of the present invention may be accompanied with little thickness irregularity in terms of a standard deviation, and may have a small thickness fluctuation of at most 20% in terms of a ratio of the standard deviation to the average thickness.

Hereinbelow, the process for producing a stretched PCTFE film will be described.

[Starting resin]

The starting PCTFE resin may preferably have a melt flow rate (according to JIS K7210) of $1 \times 10^{-3} - 3 \times 10^{-2}$ cc/sec, particularly $1.5 \times 10^{-3} - 2 \times 10^{-2}$ cc/sec. If the melt flow rate of the starting PCTFE resin (before extrusion) is below $1 \times 10^{-3}$ cc/sec, the melt-extrusion becomes difficult and, even if an increase in melt flow rate up to a T-die position is taken into account, the melt flow rate at the T-die position may be insufficient, thus being liable to cause melt-fracture. On the other hand, a melt flow rate of the starting resin exceeding $3 \times 10^{2}$ cc/sec may be desirable for easiness alone of the low-temperature extrusion but, because of too small a molecular weight, it becomes difficult to obtain an extruded stock sheet suitable for the low temperature stretching as will be described later, particularly in view of the increase in melt flow rate during the melt-extrusion.

[Melt-extrusion condition]

The melt-extrusion of the PCTFE resin may be performed at a temperature in the range of 250°–320° C., preferably 250°–310° C., more preferably 290°–310° C., further preferably 290°–307° C. If the melt-extrusion temperature is below 250° C., the extrusion of the PCTFE resin becomes difficult. On the other hand, in excess of 320° C., the local thermal decomposition is proceeded to result in a stock sheet which is liable to cause a local over-stretching at the time of low-temperature stretching, so that it becomes difficult to obtain a good film state.

In order to suppress the local thermal decomposition, the melt-extrusion may preferably be performed under such a condition that the PCTFE resin constituting the melt-extruded sheet is caused to have a melt flow rate which is at most 30 times, preferably at most 25 times, that of the starting PCTFE resin before the extrusion. The ratio may be lowered by lowering the melt-extrusion temperature or by reducing the residence time or a compression and shearing force acting in the extruder.

It is preferred that the resin constituting the thus-melt-extruded sheet product has a melt flow rate (according to JIS K7210) of $3 \times 10^{-2} - 2 \times 10^{-1}$ cc/sec, cc/sec more preferably in the range of $5 \times 10^{-2} - 1.4 \times 10^{-1}$ cc/sec. If the melt flow rate of the extruded sheet (corresponding to the melt flow rate of the resin at the T-die of the extruder) is below $3 \times 10^{-2}$ cc/sec, melt-fracture is liable to occur at the time of the melt-extrusion, thus leading to failure in providing a good PCTFE stretched film. On the other hand, if the resin constituting the extruded sheet shows a melt flow rate exceeding $2 \times 10^{-1}$ cc/sec, the stretched sheet is liable to be broken before the necking propagates over the entire sheet because of too small a molecular weight. Further, a lower molecular weight promotes crystallization so that it becomes difficult to obtain a stock sheet having a low crystallinity, thus making the stretching difficult. Incidentally, the melt flow rate of the resin of the extruded sheet is substantially retained as it is in the product stretched film because the process steps thereafter, including stretching and heat-setting, if any, are performed at lower temperatures.

[Cooling conditions after melt-extrusion]

Then, the melt-extruded stock sheet or film of PCTFE resin may preferably be cooled or quenched down to a temperature of at most 100° C., to suppress crystallization of the PCTFE stock sheet and facilitate the stretching thereof.

[Stretching conditions]

The PCTFE stock sheet obtained in the above-described manner may be stretched uniaxially or biaxially at an areal stretch ratio of at least 3 times, preferably 4–64 times, further preferably 6–25 times, at a temperature of 50°–85° C., preferably 52°–80° C. If the stretching is performed at a temperature exceeding 85° C., the thermally decomposed portion is liable to cause overstretching, thereby providing local excessively stretched portion leading to a thickness irregularity. On the other hand, below 50° C., the stretching becomes difficult.

In the present invention, the stretching may be performed in at least one direction. More specifically, the stretching may be performed, for example, as uniaxial stretching, successive biaxial stretching or simultaneous biaxial stretching. In order to provide a uniform orientation over a planar extension of the resultant film, it is preferred to effect biaxial stretching, particularly biaxial stretching with substantially equal stretch ratios in two axial directions.

The stretching may be performed in various modes, inclusive of roller stretching in a uniaxial direction, uniaxial or biaxial stretching using a tenter, and biaxial stretching using a combination of rollers and a tenter.

The roller stretching used in the present invention should be clearly differentiated from rolling. In the rolling, the stock sheet is thinned into a film under application of a compression and shearing force acting between a pair of rollers pressed against each other whereas, in the roller stretching, the stock sheet is thinned into a film under application of a tension acting between a pair of rollers spaced apart from each other. As a result, a stretched film obtained by the roller stretching shows a strong uniaxial orientation as a result of X-ray diffraction analysis, whereas a thinned film obtained through the rolling shows a weak biaxial orientation characteristic, rather than a uniaxial orientation, and also shows an inclination of the crystal c-axis.

Further, by the rolling, it is difficult to obtain a rolling ratio (corresponding to the stretch ratio herein) defined as a ratio of a stock sheet thickness/a rolled film thickness and also difficult to obtain a thin film including an amorphous portion with molecular chains under a high tension as obtained by the present invention.

The weak biaxial orientation characteristic of a rolled film may be confirmed by a low value of orientation AA (%) as measured in the following manner. Based on "a method of measuring an orientation of fibrous sample materials " described at page 81 of "Manual for X-Ray Diffraction " (Third revised edition), published from Rigaku Denki K.K. (Jun. 30, 1985), X rays are incident to a sample film in an End direction (parallel to the film surfaces and also parallel to the MD direction) or an Edge direction (parallel to the film surfaces and also parallel to the TD direction) to obtain an End image (or Edge image) formed by diffraction from the (101) plane. Among 6 spots images in the End (or Edge) image, two spots near the Equator line difficult to discriminate are excluded, and the half value widths Wi (degrees) for the remaining four spots at β angles of 60 degrees, 120 degrees, 240 and 300 degrees are summed to provide a total value ΣWi (degrees). The orientation AA (%) may be calculated from the following equation:

$$AA\% = [(360 - \Sigma Wi)/360] \times 100.$$

According to the above measurement, a rolled film (with a crystallinity of at least 50%) has provided a low orientation of below 60% which is remarkably lower than an orientation of at least 70%, preferably at least 80%, of a biaxial stretched film (with a crystallinity of at least 50%).

[Condition for heat-setting (for providing a higher crystallinity)]

In the present invention, the film after the above stretching may be subjected to heat-setting. The heat-setting temperature may be in the range of 120°–230° C., preferably in the range of 140° C. to the melting point. A temperature of below 120° C. requires a long time for obtaining a desired crystallinity, thus being inferior in industrial productivity. On the other hand, above 230° C., the film is liable to be broken because of the melting of the resin. The time for the heat-setting may be appropriately set so as to provide a desired crystallinity, and a time of 10 sec or more may generally be sufficient.

As a result of the heat-setting, the stretched PCTFE film may be provided with a good size-stability (heat shrinkage-preventing characteristic) and also an increased crystallinity to provide an improved moisture-proofness.

Through the above steps, the stretched PCTFE film according to the present invention may preferably be formed as a thin film having a thickness of at most 100 μm, particularly 20–70 μm. For a film having a thickness d μm (≠20 μm), its moisture permeability value B' (mg/m².day) may be converted into a moisture permeability B at a 20 μm thickness by a formula of B=B'×(d/20).

Two or more sheets of the stretched PCTFE film of the present invention can be applied to each other to form a laminated film. This mode of laminated film can provide a remarkably improved moisture-proofness reliability than a single layer film since, even if a film is accompanied with a pinhole or a perforation as a result of inclusion of foreign matter into the film, the perforation is sealed as a result of the lamination.

Because of its moisture permeation-preventing performance, the stretched PCTFE film according to the present invention may suitably be used to provide a packaged product by covering with the film an insert with which moisture contact is not desirable so as to suppress moisture permeation to the insert from an environment. Preferred embodiments of such a packaged product may include an EL device (FIG. 1) and a packaged drug (FIG. 2).

Referring to FIG. 1, an EL device includes a light emission layer 1 comprising a fluorescent material (e.g., a mixture of a principal agent, such as zinc sulfide, zinc selenium or zinc sulfide-cadmium sulfide; powder of metal, such as copper, silver, gold or manganese; and a halogen, such as chlorine, bromine or iodine, or powder of a metal, such as aluminum or potassium) and a polymeric binder. The light emission layer 1 is sandwiched between a pair of electrodes 2a and 2b of which at least one is transparent (e.g., of ITO), and further by a pair of substrates 3a an 3b of which at least one is transparent (e.g., of glass or plastic) to provide an EL device structure. The device structure is further covered and sealed up with a pair of films 4a and 4b each in a thickness of ca. 50–300 μm and composed of a stretched PCTFE film of the present invention.

Referring to FIG. 2, a packaged drug product includes a rigid resin film 11 of, e.g., ca. 100–300 μm-thick polyvinyl chloride film. Separately, a stretched PCTFE film 14 according to the present invention of, e.g., ca. 10–300 μm, preferably ca. 20–100 μm, in thickness is subjected to a surface adhesiveness-improving treatment, such as a low-temperature plasma treatment, and both surfaces thereof are coated with hot-melting adhesive layers 12 and 13 of, e.g., ethylene-ethyl acrylate adhesive. The PCTFE film 14 is applied onto one surface of the rigid resin film 11 via the adhesive layer 12 by thermal melt-bonding to form a laminated film structure which is then (deeply) drawn to form a cover film 10 providing a drug-storing cavity 15. Separately, a moisture-non-pervious substrate film 18 of Al, etc., coated on its one surface with a hot-melting adhesive layer 17 is provided and, after placing a drug 16 in the cavity 15 of the cover film 10, the cover film 10 and the substrate film 18 are heat-bonded to each other to form a sealed structure as shown in FIG. 2.

The above-mentioned structures are of course nothing more than mere examples even with respect to the EL device and the packaged drug product; and various other structures can be adopted inclusive of those having a larger number of layers, for example.

EXAMPLES

Hereinbelow, the present invention will be described more specifically based on Examples and Comparative Examples.

Incidentally, the film properties described in the following Examples were measured according to the following methods and the film properties described herein are also based on such measured values.

[Crystallinity]

The density D of a sample film at 30° C. was measured by a density-gradient tube, and the crystallinity was calculated from the following equation. The density gradient liquid was prepared by mixing carbon tetrachloride and bromoform.

Crystallinity $A$ (%)=$[(D-2.072)/(2.183-2.072)] \times 100$

[Melt flow rate]

The melt flow rate of a sample resin was measured by using a flow tester ("Shimazu Flow Tester CFT-500A", available from K. K. Shimazu Seisakusho) according to JIS K7210 and under the conditions of temperature of 230° C., a load of 100 kg-f, a nozzle diameter of 1 mm and a nozzle length of 1 mm.

[Moisture permeability]

An objective film was cut into sample films each in sizes of 100 mm-L×100 m-W, and two sheets of the sample film were superposed with each other, followed by heat-sealing of the entire peripheral region in a width of 5 mm so as to enclose ca. 5 g of calcium chloride. The total weight of the thusprepared desiccant-containing package (pouch) was measured. Then, the package was left standing for 1000 hours in an environment of a temperature of 40° C. and a relative humidity of 90%, and then the total weight of the package was measured to calculate a moisture weight absorbed by the calcium chloride, from which the moisture permeability B of the film was calculated. Incidentally, in case where a moisture permeability B' (mg/m².day) was obtained for a film having a thickness d μm (d≠20), a moisture permeability B for a 20 μm-thick film was calculated by using the formula of B=B'×(d/20) as mentioned above.

[Rupture stress]

A sample film cut into sizes of 10 mm-wide and 50 mm-long was subjected to a tensile tester by using a tester ("RTM-100" available from Toyo Balawin K.K.) at a tensile speed of 50 mm/min. in an environment of a temperature of 23° C., and a relative humidity of 50%.

[Thickness fluctuation]

A thickness meter ("DG-911", available from Ono Sokutei K.K.) was used to measure the thickness of a sample film at intervals of 5 mm each in a transverse direction. From the measured thickness, an average thickness x (μm) and a standard deviation δ (μm) were obtained to calculate a thickness fluctuation (%) as (3δ/x)×100.

[Melt-extrusion stability]

The extrusion state of a sample PCTFE resin at the time of melt-extrusion was observed with eyes and evaluated. The results are indicated by "x" in case where melt-fracture occurred and by "o" in case where the melt-extrusion was stably performed without causing melt-fracture.

Examples 1–6, Comparative Examples 1–5

Starting PCTFE resins (chlorotrifluoroethylene homopolymers) each in the form of pellets and respectively having melt flow rates shown in Tables 1 and 2 appearing hereinafter were respectively supplied to a 35 mm-dia. single screw extruder, extruded through a T-die under conditions shown in Table 1 or 2 and cooled and solidified on a cooling drum having a surface temperature of 25° C. to form stock sheets (or films) having a thickness shown in Table 1 or 2. The stock sheets were respectively subjected to stretching under conditions shown in Table 1 or 2 and then optionally subjected to heat-setting (in case where the conditions therefor are indicated in Tables 1 and 2) to obtain biaxially stretched films. The properties of the films thus obtained are shown in Tables 1 an 2. Incidentally, the extruded sheet in Example 6 intermittently caused melt-fracture resulting in a surface roughness, and the sheet portions free from the melt-fracture were stretched and heat-set to form stretched films, the properties of which are shown in Table 1.

TABLE 1

|  | Ex. 1 | Ex. 2 | Ex. 3 | Ex. 4 | Ex. 5 | Ex. 6 |
|---|---|---|---|---|---|---|
| Melt flow rate (cc/sec) | | | | | | |
| Starting resin | $1.5 \times 10^{-3}$ | $1.5 \times 10^{-3}$ | $1.5 \times 10^{-3}$ | $9.1 \times 10^{-3}$ | $1.6 \times 10^{-2}$ | $1.5 \times 10^{-3}$ |
| Film | $4.0 \times 10^{-2}$ | $4.0 \times 10^{-2}$ | $4.0 \times 10^{-2}$ | $5.6 \times 10^{-2}$ | $6.3 \times 10^{-2}$ | $2.5 \times 10^{-2}$ |
| Ratio (film/resin) | 26.7 | 26.7 | 26.7 | 6.2 | 3.9 | 16.7 |
| Extrusion temp. (°C.) | 305 | 305 | 305 | 305 | 305 | 305 |
| Extrusion stability | o | o | o | o | o | x |
| Stock sheet thickness (μm) | 180 | 180 | 180 | 450 | 450 | 180 |
| Stretch ratio (MD × TD) | 3 × 3 | 3 × 3 | 3 × 3 | 3 × 3 | 3 × 3 | 3 × 3 |
| Stretch temp. (°C.) (MD × TD) | 70 × 60 | 70 | 70 × 60 | 65 × 56 | 65 × 56 | 70 × 60 |
| Stretch mode | successive | simultaneous | successive | successive | successive | successive |
| Heat-setting | | | | | | |
| Temp. (°C.) | 180 | 180 | — | 180 | 180 | 180 |
| Time (sec) | 25 | 600 | — | 25 | 25 | 25 |
| Crystallinity A (%) | 56 | 58 | 18 | 53 | 54 | 56 |
| Moisture permeability B (mg/m² · day) | 93 | 110 | 175 | 95 | 96 | 91 |
| B/(100-A) | 2.11 | 2.61 | 2.13 | 2.02 | 2.09 | 2.07 |
| Rupture stress (MPa) MD | 88 | 111 | 85 | 112 | 117 | 104 |
| TD | 87 | 97 | 82 | 96 | 99 | 92 |
| Thickness fluctuation (%) | 16 | 16 | 16 | 16 | 16 | 20 |

TABLE 2

|  | Comp. Ex. 1 | Comp. Ex. 2 | Comp. Ex. 3[*1] | Comp. Ex. 4[*2] | Comp. Ex. 5[*3] |
|---|---|---|---|---|---|
| Melt flow rate (cc/sec) | | | | | |
| Starting resin | $1.5 \times 10^{-3}$ | $1.5 \times 10^{-3}$ | $1.5 \times 10^{-3}$ | $1.5 \times 10^{-3}$ | $2.0 \times 10^{-2}$ |
| Film | $4.0 \times 10^{-2}$ | $4.0 \times 10^{-2}$ | $1.5 \times 10^{-1}$ | $4.0 \times 10^{-2}$ | $6.5 \times 10^{-2}$ |
| Ratio (film/resin) | 26.7 | 26.7 | 100 | 26.7 | 32.5 |
| Extrusion temp. (°C.) | 305 | 305 | 330 | 305 | 315 |
| Extrusion stability | o | o | o | o | o |
| Stock sheet thickness (μm) | 20 | 20 | 180 | 180 | 20 |
| Stretch ratio (MD × TD) | — | — | 3 × 3 | 3 × 3 | — |
| Stretch temp. (°C.) (MD × TD) | — | — | 70 × 60 | 100 × 100 | — |
| Stretch mode | | | successive | successive | |
| Heat-setting | | | | | |
| Temp. (°C.) | — | 180 | — | 180 | 180 |
| Time (sec) | — | 3600 | — | 25 | 25 |
| Crystallinity A (%) | 18 | 57 | — | — | 55 |
| Moisture permeability B (mg/m² · day) | 380 | 225 | — | — | 245 |
| B/(100-A) | 4.63 | 5.23 | — | — | 5.44 |
| Rupture stress (MPa) MD | 85 | 88 | — | — | 45 |
| TD | 54 | 33 | — | — | 21 |
| Thickness fluctuation (%) | 26 | 26 | — | — | 25 |

[*1]In Comparative Example 3, a film rupture occurred during the stretching in the transverse direction (TD) after the stretching in the machine direction (MD).
[*2]In Comparative Example 4, a film rupture occurred after the stretching.
[*3]In Comparative Example 5, the stock sheet caused a rupture on stretching, so that the stock sheet per se was subjected to the measurement of the film properties.

As described above, the present invention provides a stretched PCTFE film obtained through effective stretching of its amorphous portion to improve the moisture permeation resistance and showing a good moisture proofness even at a low crystallinity; a process for effectively producing such a stretched PCTFE film characterized by melt-extrusion at a relatively low temperature and a low-temperature stretching; and also a packaged product using such a stretched PCTFE film, such as an EL device and a packaged drug product.

What is claimed is:

1. A stretched polychlorotrifluoroethylene film comprising a biaxially stretched film of a polychlorotrifluoroethylene resin, and having a crystallinity A in % of 15–75–% and a moisture permeability B in mg/m² ·day at a film thickness of 20 μm, and at an environmental temperature of 40° C., wherein the film satisfies the relationship of formula (1) below:

$$B/(100-A) \leq 3.0 [2.8] \qquad (I).$$

2. A film according to claim 1, satisfying the relationship $B/(100-A) \leq 2.7$.

3. A film according to claim 1, satisfying the relationship of $B/(100-A) \leq 2.8$.

4. A film according to claim 1, wherein said polychlorotrifluoroethylene resin forming the stretched film shows a melt flow rate of $3 \times 10^{-2} - 2 \times 10^{-1}$ cc/sec, when measured by extrusion through a nozzle having a diameter of 1 mm and a length of 1 mm at 230° C. and under a load of 100 kg-f.

5. A film according to claim 1, having a rupture stress of at least 50 MPa, as measured by a tensile test at a tensile speed of 50 mm/min. at a temperature of 23° C. and a relative humidity of 50%.

6. A film according to claim 1, having a thickness fluctuation of at most 20%.

7. A packaged product, comprising a packaging sheet material and an insert within the packaging material, wherein said packaging sheet material comprises a stretched polychlorotrifluoroethylene film according to claim 1 covering the insert so as to prevent moisture from permeating the insert from an environment.

8. A product according to claim 7, wherein the insert comprises a light emission device.

9. A product according to claim 7, wherein the insert comprises a drug.

10. A process for producing a stretched polychlorotrifluoroethylene film comprising a biaxially stretched film of a polychlorotrifluoroethylene resin, and having a crystallinity A in % of 15–75% and a moisture permeability B in mg/m²·day at a film thickness of 20 μm, and at an environmental temperature of 40° C., wherein the film satisfies the relationship of formula (I) below:

$$B/(100-A) \leq 3.0 \qquad (I)$$

which comprises melt extruding a polychlorotrifluoroethylene resin at a temperature of 250° to 320° C. to form a sheet, and stretching the sheet at an areal stretch ratio of at least 3.0 at a temperature of 50° to 85° C. to form said film.

11. The process according to claim 10, wherein said polychlorotrifluoroethylene resin is extruded so that the polychlorotrifluoroethylene resin forming the extruded sheet shows a melt flow rate which is at most 30 times that of the resin before the extrusion.

12. The process according to claim 10, wherein the polychlorotrifluoroethylene resin forming the extruded sheet shows a melt flow rate of $3 \times 10^{-2}$ to $2 \times 10^{-1}$ cc/sec.

13. The process according to claim 10, wherein said polychlorotrifluoroethylene resin is melt-extruded at a temperature of 250° to 310° C.

14. The process according to claim 10, wherein said film formed by the stretching is further heat-set at a temperature in the range of 120° to 230° C.

* * * * *